Sept. 12, 1939.  C. W. MOTT  2,172,987
SUPPORTING DEVICE FOR IMPLEMENT ATTACHMENTS
Filed Nov. 18, 1937  2 Sheets-Sheet 1

Inventor
Carl W. Mott.
By
Att'y.

Sept. 12, 1939.   C. W. MOTT   2,172,987
SUPPORTING DEVICE FOR IMPLEMENT ATTACHMENTS
Filed Nov. 18, 1937   2 Sheets-Sheet 2
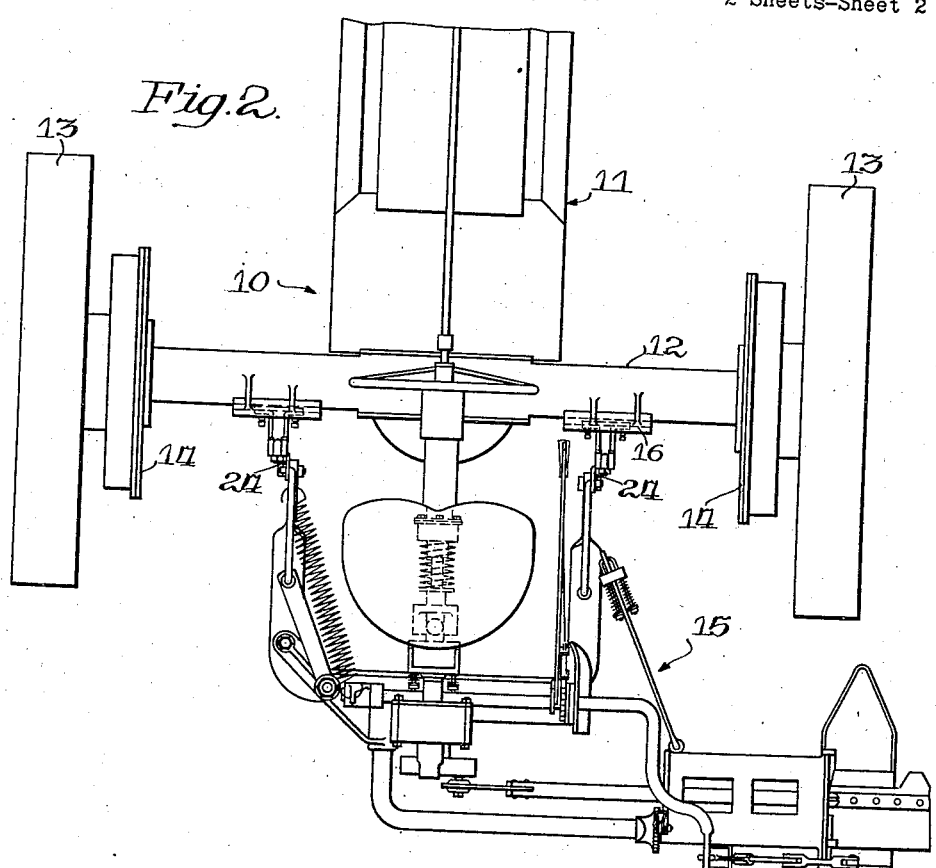
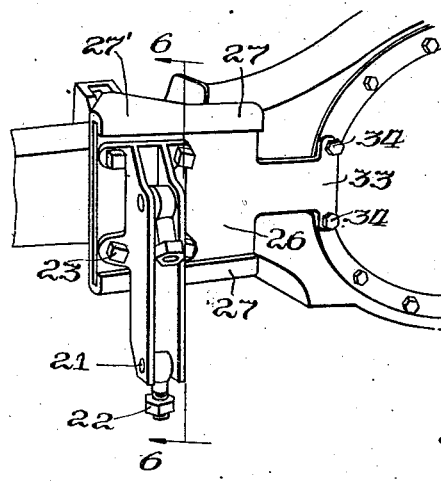
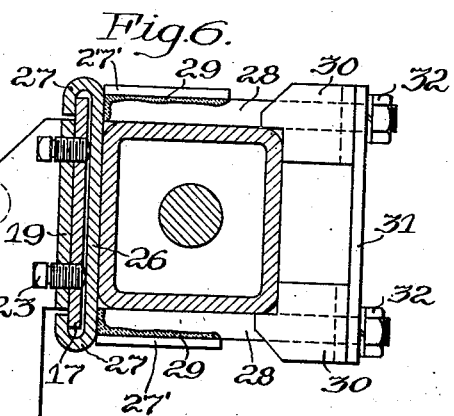
Inventor
Carl W. Mott.
By (signature)
Att'y.

Patented Sept. 12, 1939

2,172,987

UNITED STATES PATENT OFFICE 2,172,987

SUPPORTING DEVICE FOR IMPLEMENT ATTACHMENTS

Carl W. Mott, Rock Falls, Ill., assignor to International Harvester Company, a corporation of New Jersey Application November 18, 1937, Serial No. 175,203

6 Claims. (Cl. 56—25)

This invention relates to a device for coupling a mower attachment to a tractor.

In the patent to Crumb et al., 1,977,429 of October 16, 1934, there is shown a tractor of the low-axle type supporting a mower attachment from its axle. It has been found desirable to support this same mower attachment from the axle of a high-axle type tractor. In order that this may be accomplished, a change in the device for supporting the mower attachment from the axle is necessary.

The principal object of this invention is to provide a device for supporting a mower attachment from the axle of a high-axle type tractor.

Another object of the invention is to provide means for supporting a mower attachment from the axle of a high-axle type tractor in such a way that the mower attachment may be quickly attached and detached.

A further object of the invention is to provide a device of special design for the supporting of a mower attachment from the axle of a tractor.

Another object is the provision of means allowing quick attachment and detachment of a mower attachment in supporting relation to a tractor.

A further object of the invention is to provide a means for supporting an implement attachment from the axle of a tractor.

Another object of the invention is the provision of a device for supporting an implement attachment from the axle of a tractor in such a way that it may be quickly attached and detached.

A further object of the invention is to provide a device of special design for supporting an attachment from a vehicle.

Another object is to provide a device for supporting an attachment from a vehicle in quick-detachable and quick-attachable relation.

A further object is to provide means for adjustably and detachably clamping the aforesaid supporting device to the axle of the vehicle or tractor.

Other objects of the invention will appear as the disclosure is more fully made.

According to the present invention, the mower attachment is supported from the rear axle of a tractor by means of a pair of special brackets, which are clamped in adjustable and detachable relation to the rear face of the rear axle and extend below the point of clamping and carry swingable bolts for supporting the mower attachment in quick-detachable relation. According to one form of the invention the brackets are clamped to the axle in guideways which are integral with the axle. According to a second form, separate plates providing guideways for the brackets are clamped to the axle.

In the drawings,

Figure 4 is a sectional view taken along the line 4—4 of Figure 3;

Figure 5 is a detail, showing on an enlarged scale a modified scheme for attaching the bracket to the axle; and, Figure 6 is a sectional view taken along the line 6—6 of Figure 5.

Figure 1:
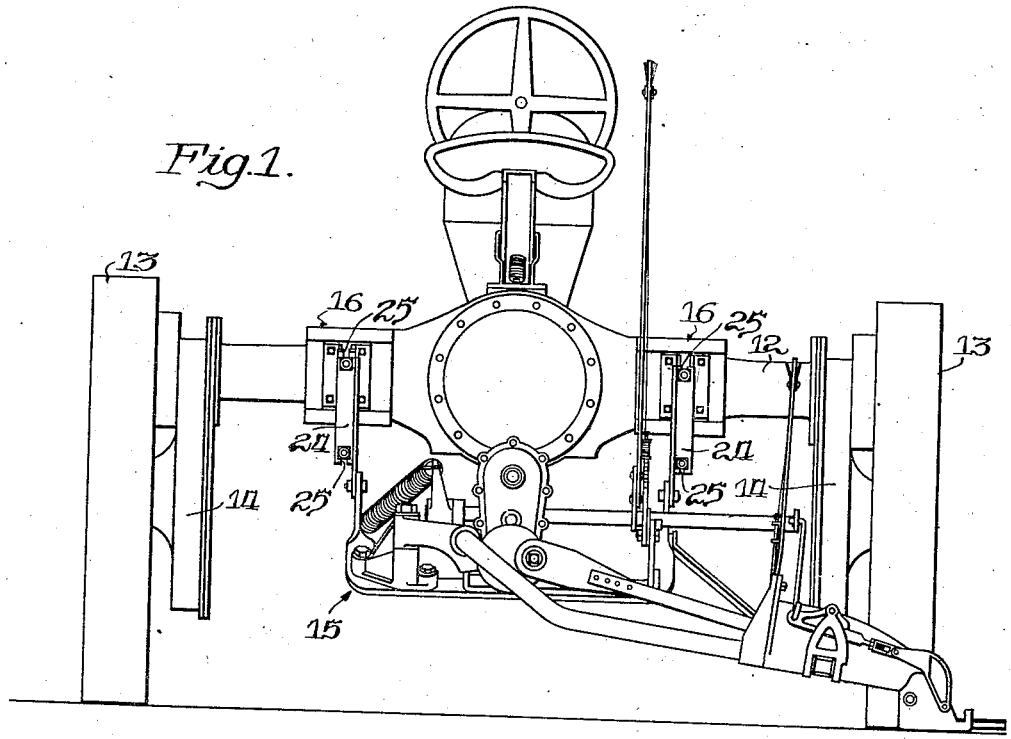
Figure 1 is a rear view of a tractor with a mower attachment suspended from the rear axle.
Figure 2:
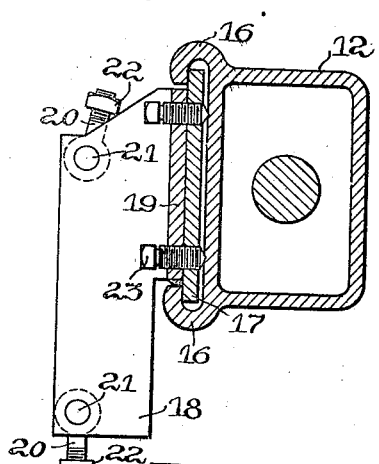
Figure 2 is a plan view of the tractor and mower attachment.

As seen in Figures 1 and 2, a tractor 10 has an engine frame 11 supported on a front steering truck (not shown). The rear end is supported on an axle housing 12, which is in turn supported by traction wheels 13. The axle housing is well above the center of the traction wheels, driving connection between the axle and the wheels being established through gears contained in the housings 14. The tractor is known as the high-axle type.

Supported rearwardly from the axle housing is a mower attachment 15 of the type shown and claimed in the patent to Crumb et al. 1,977,429, October 16, 1934. No description will be made of this attachment, since it is fully described in the aforementioned patent and forms no part of the present invention, other than to state that it must be carried at a certain definite height above the ground. As shown in the patent to Crumb et al., the mower attachment is supported by a low-axle type tractor; that is, a tractor which has its axle in line with the centers of the wheels. In order that the mower attachment might be supported at the same height above the ground from a high-axle type tractor, it was necessary to devise a new supporting means. This will now be described.

The axle housing has, on each side of its central portion, guideways in the form of integral projections or ribs 16 which extend outwardly from the rear face of the housing and then toward one another. The novel bracket member of this invention consists of a flat plate 17 constituting a base, a pair of standards 18 joined to the plate 17 through foot portions 19, and a pair of swingable bolts 20 mounted between the standards 18 at their opposite ends on pins 21 and carrying nuts 22. Set screws 23 serve to hold the bracket member in place in the guideways. The mower attachment is supported at each side by a second bracket 24 which has a flat portion having slots 25 at each end. The swingable bolts 20 fit in the slots and by means of the nuts 22 hold the second bracket against the standards 18. Since the bolts may slide into or out of the slots quickly and easily, a quick-attachable connection is formed between the tractor and the mower attachment.

It is to be noted from Figure 4 that the standards 18 extend considerably below the axle housing 12. The upper swing bolt is slightly below the upper side of the axle, and the lower swing bolt is considerably below the lower side. By shaping the standards in this way, applicant has made it possible to support the mower attachment originally intended to be supported from a low-axle type tractor from a high-axle type tractor.

The bases of the novel brackets are supported in guideways on the axle housing which extend transversely of the tractor. Thus, the position of the mower attachment laterally of the tractor may be adjusted. The brackets may be quickly detached from the machine by displacement beyond the guideways.

Figure 3:
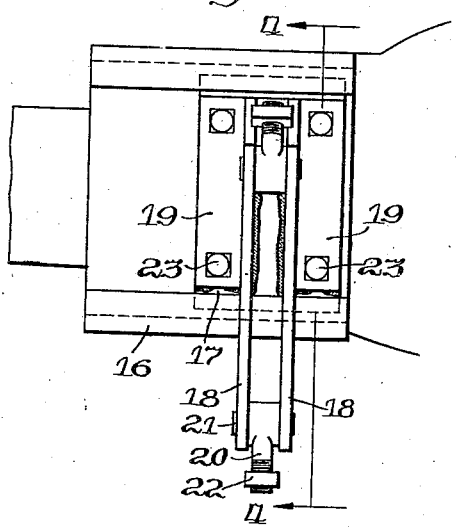
Figure 3 is a detail, showing on an enlarged scale the manner by which the novel bracket for supporting the mower attachment is attached to the rear axle of the tractor.

Figures 5 and 6 show a modified construction wherein the guideways are not integral with the axle housing but are formed as inturned edges 27 on a plate member 26. This member is clamped to the axle housing by means of pieces 27' and studs 28, welded or otherwise secured as at 29 to plate member 26 and pieces 27', clamp members 30, bar 31, and nuts 32. The plate member has a lateral extension 33 by means of which it may be bolted, as at 34, to the edge of the opening in the central part of the axle housing. The novel bracket member is attached in the guideways in the same manner as in the construction shown in Figures 3 and 4. It may similarly be adjusted along the length of the guideways for the sake of adjustment of the mower attachment laterally of the tractor and may be removed by displacement beyond the guideways.

From the foregoing description it will be seen that a novel means has been provided for supporting a mower attachment from a high-axle type tractor. It will be readily appreciated that the novel supporting means need not be limited in its use to a mower attachment and high-axle type tractor, but may be employed for supporting an attachment on a vehicle wherever the point of connection on the attachment must be displaced a considerable distance either up or down from the point of connection to the vehicle.

It is intended to limit the invention only in the scope of the appended claims.

What is claimed is:

1. A coupling adapted to connect a tractor having a relatively high rear axle and a mower attachment, said coupling comprising a plate member adapted to be clamped to a face of the rear axle of the tractor toward the mower attachment and having inturned edges extending in spaced relation to the remainder of the plate member, a bracket member having a base portion held adjacent the plate member within its inturned edges and having spaced standards extending at right angles from the base portion and extending considerably beyond one side edge of the base portion held within an inturned edge of the plate member, bolts swingably mounted between the standards adjacent opposite ends thereof, nuts on the bolts, whereby a second bracket member connected to the mower attachment and having a flat portion with slots at its edges is adapted to be held against the standards by means of the nuts and swingable bolts which pass through the slots.

2. Means for fastening an implement attachment to a tractor comprising a bracket having a base portion, a pair of spaced standards extending away from the base and considerably beyond one edge of the base, pins extending between the standards adjacent the ends thereof, and bolts mounted on the pins to swing toward or away from one another for holding the implement attachment against the standards.

3. A coupling adapted to connect a tractor having a rear axle and a mower attachment, said coupling comprising a pair of projections formed integral with one face of the rear axle and extending outwardly and then toward one another, a first bracket member having a base portion fixed within the projections to the rear axle and spaced standards extending outwardly from the base and considerably beyond one edge of the base, swingable bolts mounted between the standards adjacent the ends thereof, and nuts on the bolts, whereby a second bracket member secured to a mower attachment and having a portion with slots is adapted to be held against the standards by means of the nuts and bolts which pass through the slots.

4. A coupling for a tractor having a transverse rear axle housing, said coupling comprising channel guide means formed integral with the housing, a base member carried in the guide means, a standard having foot portions secured to the base member, and swingable members mounted on the standard.

5. A coupling comprising a plate member having inturned edges extending in spaced relation to the remainder of the plate member, a bracket member having a base portion held adjacent the plate member within its inturned edges and having spaced standards extending away from the base portion, and bolts mounted between the standards so as to swing toward or away from one another.

6. A coupling as specified in claim 5, the bracket member being slidable with respect to the plate member in the direction of the flanges thereof and being fixable with respect to the plate member by means of set screws.

CARL W. MOTT.